United States Patent [19]

Morrison et al.

[11] 4,279,676
[45] Jul. 21, 1981

[54] PROCESS OF MAKING A BELTING JOINT

[75] Inventors: Donald Morrison, Harper; William T. Muma, Jr., Anthony, both of Kans.

[73] Assignee: Morrison Company, Inc., Anthony, Kans.

[21] Appl. No.: 72,840

[22] Filed: Sep. 6, 1979

[51] Int. Cl.³ .............................................. B65H 69/06
[52] U.S. Cl. ..................................... 156/159; 156/258; 156/304.5; 428/57; 428/58; 428/60; 472/254
[58] Field of Search ............... 156/157, 159, 258, 304, 156/137, 304.5; 74/231 J; 474/253, 254, 261, 264; 24/38; 428/58, 60, 57

[56] References Cited

U.S. PATENT DOCUMENTS

| 75,554 | 3/1868 | Lemaistre . | |
|---|---|---|---|
| 241,132 | 5/1981 | Foth | 24/38 |
| 419,432 | 1/1890 | Gingras . | |
| 726,670 | 4/1903 | Geisel . | |
| 853,576 | 5/1907 | Usina . | |
| 1,322,067 | 11/1919 | Somerville . | |
| 1,452,704 | 4/1923 | Poulin et al. . | |
| 1,920,525 | 8/1933 | Roderwald . | |
| 1,996,529 | 4/1935 | Skeyhan . | |
| 3,007,826 | 11/1961 | Brooksbank | 156/159 |
| 3,689,341 | 9/1972 | Ninomiya | 156/159 |
| 3,783,063 | 1/1974 | Olsson | 156/258 |
| 4,034,617 | 7/1977 | Guyer | 74/231 J |

FOREIGN PATENT DOCUMENTS 1037110  7/1966  United Kingdom ..................... 156/159

*Primary Examiner*—Jerome W. Massie
*Attorney, Agent, or Firm*—Arnold, White & Durkee

[57] ABSTRACT

An improved method of splicing multi-ply belting material to form an endless belt. The upstream portion of the splice on each side of the belt has at least two plies of the material which have not been split, while each side of the belt on the downstream portion of the splice presents an overlying flap to a roller.

1 Claim, 5 Drawing Figures

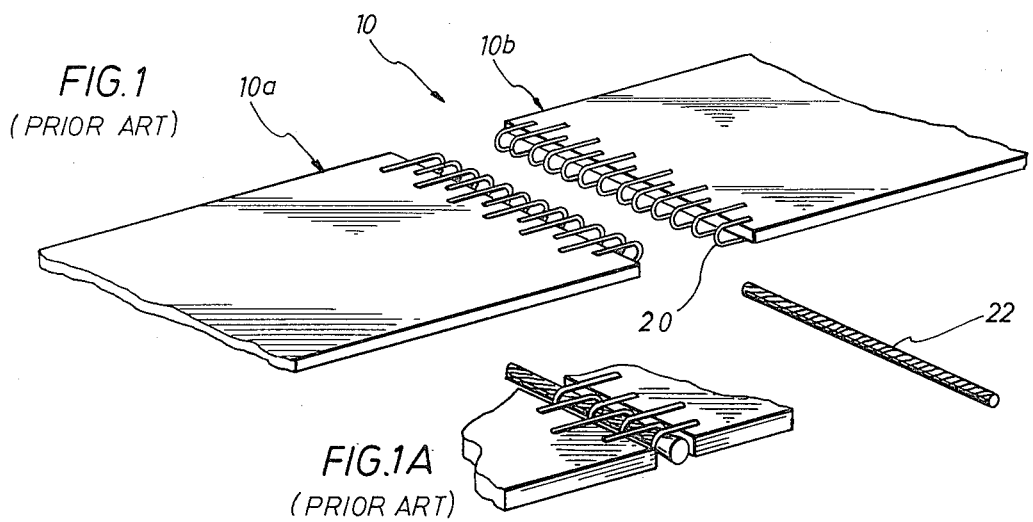
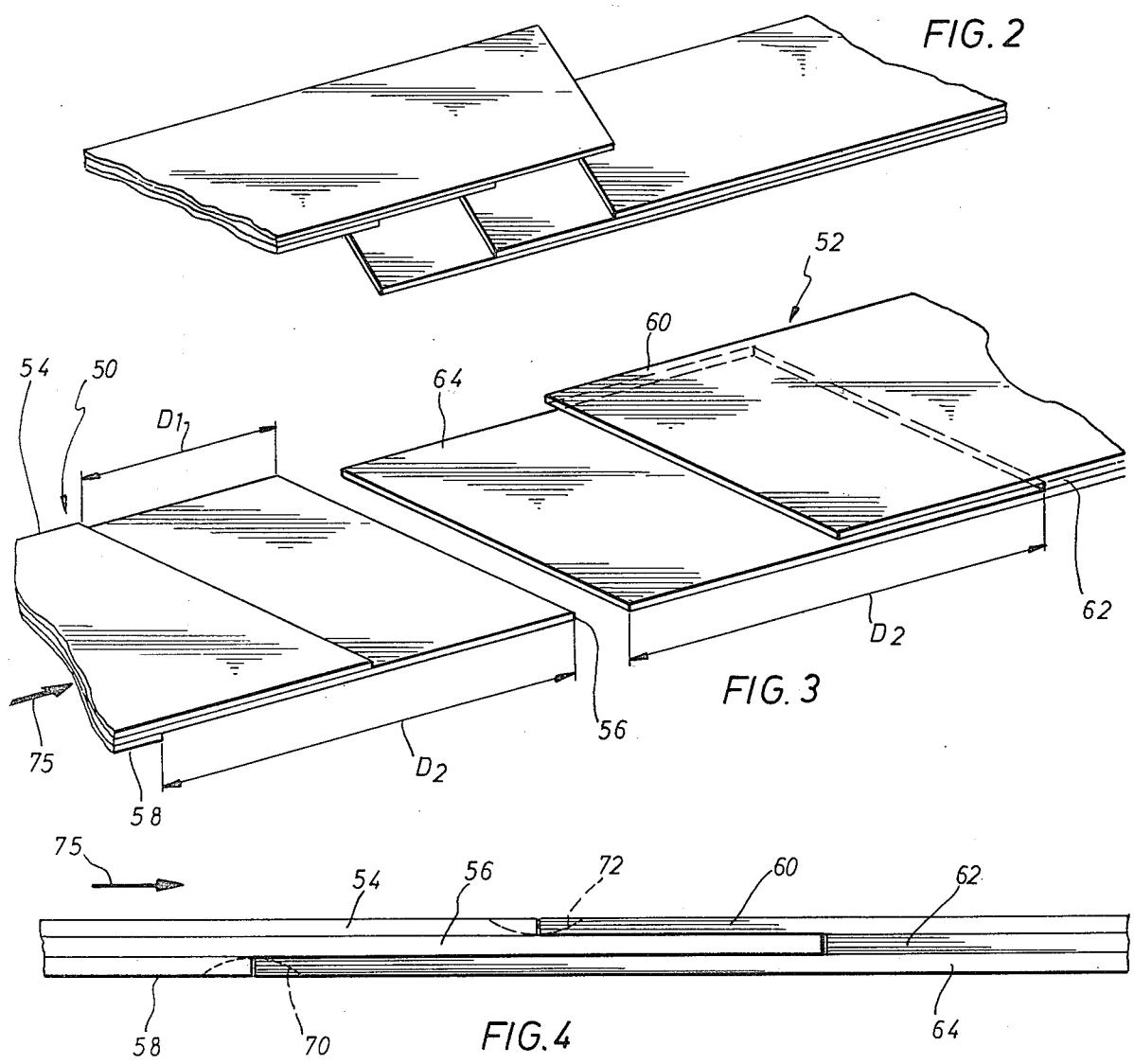

PROCESS OF MAKING A BELTING JOINT

BACKGROUND OF THE INVENTION

1. Field of the Invention

The present invention relates to a method of manufacturing belting, and, more specifically, a method of splicing belting to form an endless belt. Belting so spliced has been found to be especially useful in applications where both sides of the belt are required to contact rollers, e.g., as in the case of hay balers.

2. Description of the Prior Art

Endless belting is used in many applications as a means of transferring rotary power from a source to an object to be driven. In such applications, the belting contacts one or more rollers to effect the power transfer.

In many instances, only one side of the belting is required to contact the rollers in operation. However, in some applications, e.g., round hay balers, both sides of the belting material are required to contact rollers in the operation of the device. Since endless belting is formed by splicing two ends of the belt together, it is desirable that the splice be as strong as possible in applications where both sides of the belt contact the rollers.

Various techniques have been proposed and/or utilized for splicing the ends of belting material to make an endless belt. Referring to FIG. 1, one such technique is commonly referred to as the "clipper lace" technique, which is believed to be in common use today. As shown, a plurality of metal eyelets or hooks 20 are disposed in the ends 10a and 10b of belt 10. A rod 22 or other suitable retaining material is passed through the eyelets, and the ends of rod 22 are suitably formed to prevent removal of the rod and thereby keep the splice intact.

The "clipper lace" splice has been found to have the disadvantage of failing after a relatively short period of use. When, for example, a belt so spliced is used on round hay balers, both sides of the splice are required to contact a number of rollers in operation. Contact between the metal eyelets and the rollers causes the metal eyelets to wear thin, and the splice eventually breaks. It has been found that belting using the clipper lace splice has failed on a round hay baler after approximately 500–600 bales of hay have been produced. When such failure occurs, it is, of course, necessary to re-splice or replace the belt, in order for the baler to operate properly. If splicing equipment or an extra belt is not available on location, valuable baling time can be lost.

Other techniques have been proposed to splice the ends of belting, e.g., the so-called "step" splice, as shown in FIG. 2. This type splice is formed by progressively cutting back the plies at each end of the belt and then joining the ends so formed with a suitable adhesive material to make the splice. Belting made in accordance with this technique has not only a specified direction of travel, but also a specified side which is to contact the rollers. Thus, while belting made with this type of splice may be useful in circumstances where only one side of the belt contacts rollers, it is unacceptable in applications where both sides of the belting are required to contact rollers.

Endless belting fabricated of orientated nylon material is available, and it is believed that this belting is capable of use in some operations wherein both sides of the belt is required to contact rollers. It is further believed that the belting is spliced by a technique similar to that illustrated in FIG. 2. This type belting has the disadvantages of: (1) being expensive; and (2) failing when used in an agricultural environment.

SUMMARY OF THE INVENTION

In accordance with the present invention, an improved method of splicing the ends of multi-ply belting material to form an endless belt is provided. On each side of the belting formed in accordance with the present invention, the downstream portion of the splice includes an overlying flap which contacts a roller in the first instance. The upstream portion of the splice comprises at least two plies of the original belting material which have not been split, and, at all points in the splice, there are at least two plies of the original belting material. Thus, either side of belting in accordance with the present invention may be engaged by a roller, so long as a constant direction of travel of the belt is maintained.

In one embodiment of the present invention in which three-ply material is used, the first outer ply of the upstream end of the belt is split back a first distance, and the second outer ply of the upstream end is split back a second distance. Preferably, the first and second distances are unequal, and the difference in length between the first and second distances is greater than one-half the circumference of the roller which the belt will engage during use.

In this embodiment, the middle ply of the downstream end of the material is split back a third distance equal to the sum of the first and second distances. A length of the outer ply of the downstream end which mates with the first outer ply of the upstream end is removed. Thus, the two ends of the belting material may be spliced by mating the upstream and downstream ends of the belt.

BRIEF DESCRIPTION OF THE DRAWINGS

FIGS. 1 and 1A are perspective views of a clipper lace type splice formed in accordance with prior art techniques.

FIG. 2 is a perspective view of a step and groove type splice formed in accordance with prior art techniques.

FIG. 3 is a perspective view of belting material, which illustrates the splicing technique in accordance with the present invention.

FIG. 4 is a side view of the belting shown in FIG. 3, which illustrates the ends of the belting material in mated arrangement.

DESCRIPTION OF SPECIFIC EMBODIMENTS

It will be appreciated that the present invention can take many forms and embodiments. One specific embodiment of the present invention is described herein so as to give an understanding of the invention. It is not intended, however, that the embodiment herein described should in any way limit the true scope and spirit of the invention.

Referring to FIGS. 3 and 4, there are illustrated two ends 50 and 52 of three-ply belting material to be spliced to form an endless belt. The belting may, for example, be an SBR compound with nylon fabric, which is available from a number of sources, e.g., Goodyear Rubber Company.

The belt, when fabricated, is designed to travel in one direction, as indicated by arrow 75. End 50 of the belting material is referred to herein as the upstream end, while end 52 is referred to herein as the downstream end.

In accordance with the present invention, outer ply 54 of upstream end 50 is split from middle ply 56 a distance D1 and is removed. Likewise, outer ply 58 of upstream end 50 is split from middle ply 56 a distance D2 and is removed. The middle ply 62 of downstream end 52 is split back from outer plies 60 and 64 a distance D2 and is removed, and a length of outer ply 60 equal to distance D1 is removed. In one embodiment, D2 equals eight inches and D1 equals four inches. It has been found that the stripping of the plies can be accomplished most effectively by employing a Rapid Blade Knife Splitting machine, such as the Model NAF-470 manufactured by Fortune Machine Company of Germany. As shown most clearly in FIG. 4, when the above-described stripping process has been completed, upstream end 50 and downstream end 52 are mated together to form the splice.

Upstream end 50 is secured to downstream end 50 as follows: First, a coat of adhesive is applied to all cut surfaces and ends and is allowed to dry. One such suitable adhesive is a hot vulcanizing cement, such as the type No. 498, which is available from Morrison Co., Inc., the assignee of the present application.

Next, a thin sheet (preferably 0.01 inches thick) of uncured rubber (not shown), which is commonly referred to as "tie-gum," is disposed on the exposed faces of middle ply 56 of upstream end 50. The tie-gum is then rolled with a metal roller to remove any air which may have been trapped between it and the faces of middle ply 56. As known to those skilled in the art, this rolling process is referred to as "stitching." The upstream end 50 and the downstream end 52 are tacked together by engaging one face of middle ply 56 with the face of outer ply 64, as shown in FIG. 4. Similarly, the other face of ply 56 is engaged with outer ply 60.

As shown in FIG. 4, a groove 70 is ground at the joint between outer plies 58 and 64. Likewise, groove 72 is ground at the joint between outer plies 54 and 60. Preferably, grooves 70 and 72 are approximately one-half inch wide at the outer plies. A coat of adhesive is then applied to each ground out area and allowed to dry. Tie-gum is then disposed in each groove 70, 72 and it is "stitched." The splice is then vulcanized at 300° F., 150 psi for 30 minutes. Following vulcanization, all excess rubber is ground from the belt.

Suppose that a belt having a length L is desired. The belting material is initially cut to a length L plus D2, and when ends 50 and 52 are spliced, the belt will then have a length L. Further, distances D1 and D2 are preferably unequal so that the joints between the two sets of outer plies [(56 and 60), (58 and 64)] are staggered. Staggering of the joints, as shown, prevents both joints from being subjected to the pressure of a roller simultaneously. It is believed that the difference in length between D2 and D1 should be greater than or equal to one-half the circumference of the roller on which the belt is designed to operate.

A belt spliced in accordance with the above-described process is stronger and more durable than prior art belting. Those features we believed to be directly attributable to the fact that upstream portion of the joints of the outer plies has at least two plies of material that have not been split. For example, it will be observed that the upstream side of the joint between outer plies 54 and 60 comprises two plies 54 and 56, which were part of the original material. Likewise, the upstream portion of the joint between outer plies 58 and 64 has all three plies of the original belting material intact.

It will be apparent to those skilled in the art that a number of modifications may be made to the above-described process, without departing from the scope and spirit of the invention. For example, while the invention has been described for a three-ply belting material, it is readily apparent that the principles of the invention may be adapted for use with materials having a greater number of plies. It is intended that the following claims should cover all such obvious modifications to the process described herein.

What is claimed is:

1. A method of splicing the ends of three-ply belting material to form an endless belt, comprising the steps of:
    (a) forming a tongue at the upstream end of the belting material by removing a first predetermined length of the outer ply on the first side of the material and a second predetermined length of the outer ply on the second side of the belting material, the second predetermined length being greater than the first predetermined length;
    (b) forming a groove in the downstream end of the belting material by removing a portion of the center ply of the downstream end which is equal in length to the second predetermined length and by removing a portion of material, which is equal in length to the first predetermined length, from the outer ply of the downstream end which is to mate with the first side of the upstream end;
    (c) inserting the tongue at the upstream end of the belting material into the groove in the downstream end of the material to mate said upstream and downstream ends; and
    (d) forming a secured joint between the upstream and downstream ends of the belting material.

* * * * *